Sept. 21, 1943.                    C. M. HINES                    2,329,763
                              BRAKE CONTROL SYSTEM
                          Filed April 18, 1942              2 Sheets-Sheet 2

INVENTOR
Claude M. Hines
BY
ATTORNEY

Patented Sept. 21, 1943

2,329,763

UNITED STATES PATENT OFFICE 2,329,763

BRAKE CONTROL SYSTEM

Claude M. Hines, Pittsburgh, Pa., assignor to The Westinghouse Air Brake Company, Wilmerding, Pa., a corporation of Pennsylvania Application April 18, 1942, Serial No. 439,526

26 Claims. (Cl. 303—21)

This invention relates to brake control systems for vehicles, such as railway cars and trains, and has particular relation to apparatus automatically responsive to the slipping of a vehicle wheel for causing a rapid reduction in the degree of application of the brakes associated with the wheel so as to cause the wheel to return to vehicle speed before reducing in speed to a locked or sliding condition.

In the present application, the term "slipping" or "slipping condition" as applied to a vehicle wheel refers to the rotation of the vehicle wheel at a speed less than a speed corresponding to vehicle speed at a given instant; whereas, the term "sliding" or "sliding condition" refers solely to the dragging of a vehicle wheel along a road surface or rail in a locked or non-rotative condition.

As is well known, the application of the brakes on a vehicle wheel to a degree sufficient to exceed the limit of adhesion between the wheel and rail or road surfaces causes the wheel to decelerate at an abnormally rapid rate to a locked or sliding condition. It has, moreover, been demonstrated that if the degree of application of the brakes on the wheel is rapidly reduced substantially upon the instant that the wheel begins to decelerate at the abnormally rapid rate, that is to slip, the wheel promptly ceases to decelerate and at once accelerates back toward a rotational speed corresponding to vehicle speed before reducing in speed to a locked or sliding condition. It is, of course, desirable to prevent sliding of the vehicle wheels, particularly railway car wheels, in order to prevent the development of flat spots on the wheel which necessitates repair or replacement of the wheel.

It has been found that in order to insure the restoration of a slipping wheel back toward a speed corresponding to vehicle speed, the degree of application of the brakes associated with the wheel must be reduced at least a certain amount. Moreover, in order to prevent possible recurrence of slipping, it is desirable to delay the increase in the degree of application of the brakes associated with the wheel following the slipping thereof until the wheel is substantially or fully restored to vehicle speed.

In Patent 2,257,311 of Andrew J. Sorensen, there is disclosed a brake control equipment including apparatus of the electrical type for recognizing the slipping condition of a railway car wheel and effecting a rapid reduction in the degree of application of the brakes associated with the slipping wheel. The apparatus in this patent moreover comprises an arrangement including means responsive to the pressure in the brake cylinders for causing the pressure in the brake cylinders to be reduced to below a certain value once the reduction of the pressure in the brake cylinders is initiated in response to slipping of the wheels, thereby insuring the restoration of the slipping wheels back to vehicle speed and at the same time causing the resupply of fluid under pressure to the brake cylinders to effect reapplication of the brakes to be delayed sufficiently to permit the slipping wheels to be restored substantially or fully to vehicle speed.

It is an object of my present invention to provide a vehicle brake control system of the character described in the aforegoing mentioned Sorensen patent and characterized by an arrangement for insuring the reapplication of the brakes on a wheel that has slipped in the event that the brake cylinder pressure responsive means fails to operate in its normal manner to produce this result.

It is another object of my invention to provide vehicle brake control equipment of the general character indicated in the foregoing object and characterized by a simplified arrangement omitting the brake cylinder responsive means, for controlling the length of time that the degree of application of the brakes is continuously reduced in response to a wheel-slip condition and for determining the time at which the reapplication of the brakes on a wheel which previously slipped is initiated.

It is another object of my invention to provide vehicle brake control equipment of the type indicated in the foregoing objects and including an arrangement for controlling the time during which the degree of application of the brakes associated with a slipping vehicle wheel continues in response to and following the initiation of slipping according to the time required to discharge an electrical condenser.

The above objects of my invention, as well as other objects not specifically described above, are attained by apparatus subsequently to be described, and shown in the accompanying drawings, wherein.

Description

Figure 1:
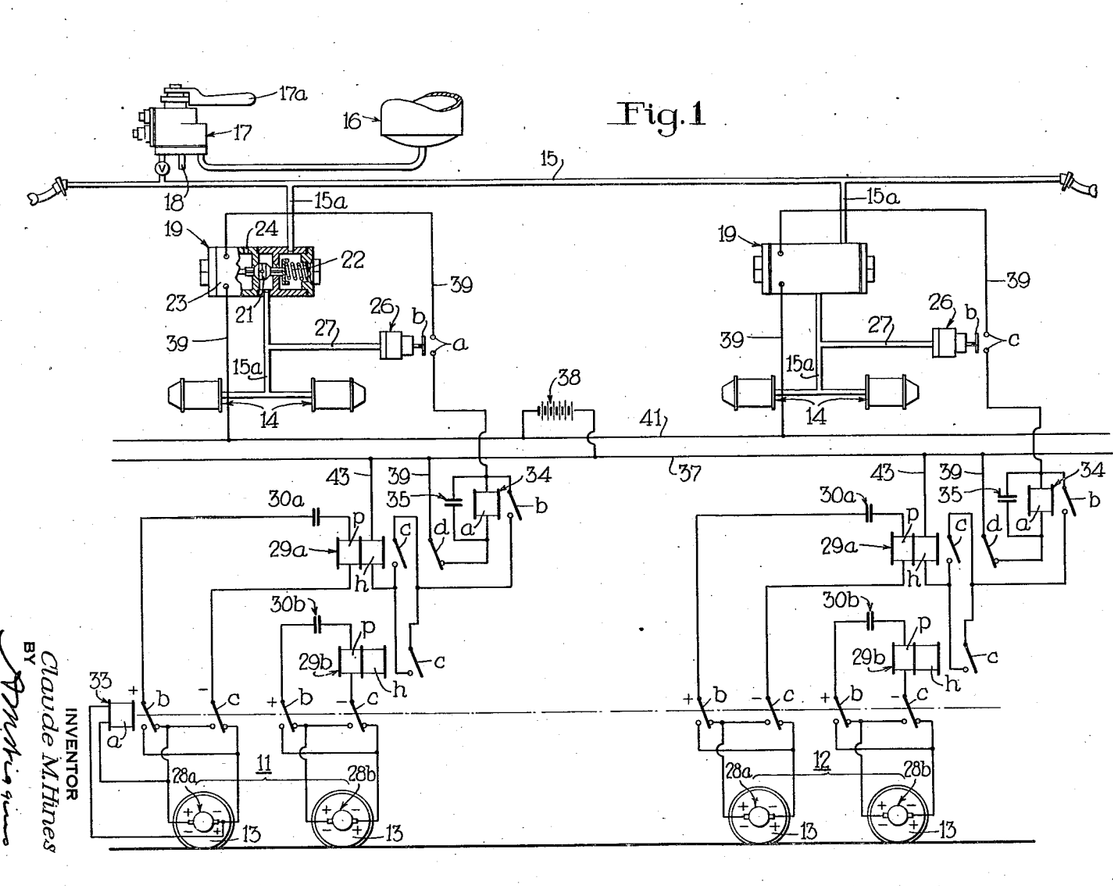
Fig. 1 is a simplified diagrammatic view, showing a vehicle brake control system embodying one form of my invention.

Referring to Fig. 1, a simplified fluid pressure brake control system of the familiar straight-air type is illustratively shown in connection with two wheel trucks 11 and 12 of a single car. Each of the wheel trucks comprises two wheel units, each unit having a pair of wheels 13 fixed at opposite ends of a connecting axle. Only one wheel of each wheel unit is visible in the drawing. Although the term "wheel unit" is employed herein to designate a pair of axle-connected wheels, it may also refer to a single wheel or any other number of connected wheels.

The brakes associated with the car wheels 13 may be of any suitable type, such as the conventional clasp-arranged shoes engaging the rim of the wheel, operated through the medium of brake levers or rigging in response to the supply of fluid under pressure to and the release of fluid under pressure from brake cylinders 14. Although any suitable number of brake cylinders may be provided for each truck, I have illustratively shown one brake cylinder for each wheel unit, each brake cylinder being located in substantially vertical alignment above the wheel unit with which it is associated.

In practice, fluid under pressure is supplied to the brake cylinders to effect application of the brakes and released from the brake cylinders to effect release of the brakes under the control of the operator by conventional fluid pressure brake control apparatus of well-known type. For simplicity, I have shown elementary form of straight-air brake system including a train pipe, hereinafter referred to as the control pipe 15, a source of supply of fluid under pressure hereinafter referred to as the main reservoir 16, and a brake valve 17 of the self-lapping type.

Brake valve 17 is of the well-known type, described in detail and claimed in Patent 2,042,112 of Ewing K. Lynn and Rankin J. Bush and is therefore shown only in outline form and will be here but briefly described.

Brake valve 17 comprises suitable self-lapping valve mechanism having a rotary operating shaft to which an operating handle 17a is fixed. In the normal brake release position of the brake valve handle 17a, fluid under pressure is exhausted from the control pipe 15 to atmosphere through an exhaust port and pipe 18 at the brake valve. Upon displacement of the brake valve handle in a horizontal plane out of its brake release position into its so-called application zone, the exhaust communication just mentioned is closed and a supply communication is established through which fluid under pressure is supplied from the main reservoir 16 to the control pipe 15. The nature of the self-lapping valve mechanism of the brake valve 17 is such that the fluid pressure established in the control pipe 15 is substantially proportional to the degree of displacement of the brake valve handle out of its brake release position. The valve mechanism of the brake valve 17, moreover, possesses a pressure-maintaining feature for maintaining a pressure in the control pipe 15 corresponding to the position of the brake valve handle in the event that the pressure in the control pipe tends to reduce for any reason, such as leakage.

The brake cylinders 14 for each of the wheel trucks are connected by corresponding branch pipes 15a to the control pipe 15, each of the branch pipes 15a having a magnet valve device 19 interposed therein for a purpose hereinafter to be described.

Each magnet valve device 19 is of a standard type having a double beat valve 21 that is urged to left-hand seated position by a coil spring 22 and actuated to a right-hand seated position in opposition to the spring 22 in response to energization of a magnet winding or solenoid 23.

In its left-hand seated position, the double beat valve 21 establishes communication through the corresponding branch pipe 15a from the control pipe 15 to the corresponding brake cylinders 14. In its right-hand seated position, the double beat valve 21 closes communication through the branch pipe 15a and establishes communication for venting fluid under pressure from the corresponding brake cylinders through an exhaust port 24 at a rapid rate.

It will thus be seen that while the magnet winding 23 of each magnet valve device 19 is deenergized, the pressure in the corresponding brake cylinders may be increased and decreased in accordance with the increase and decrease of pressure in the control pipe under the control of the operator. When the magnet winding 23 of each magnet valve device 19 is energized, the pressure in the corresponding brake cylinders 14 is rapidly reduced independently of the pressure in the control pipe 15.

A pressure-responsive switch device 26 is provided for each wheel truck and is connected by a pipe 27 to the corresponding branch pipe 15a at a point between the brake cylinders 14 and the magnet valve device 19 so as to be subject at all times to the pressure in the brake cylinders. The pressure switches 26 are preferably of the snap-acting type shown in Patent 2,096,492 to Ellis E. Hewitt. Briefly, each pressure switch 26 comprises a pair of stationary insulated contacts $a$ and a movable contact $b$. As long as the pressure in the brake cylinders 14 is less than a certain value, such as fifteen pounds per square inch, the movable contact $b$ is actuated to its open position out of engagement with the associated contact $a$. When the pressure in the brake cylinders 14 increases above fifteen pounds per square inch, the contact $b$ is actuated by snap-action into its closed position engaging the associated contacts $a$ and remains in such position as long as the brake cylinder pressure exceeds fifteen pounds per square inch. When the pressure in the brake cylinders reduces below fifteen pounds per square inch, contact $b$ is actuated by snap-action to its open position out of engagement with the contacts $a$. The function of the pressure switches will be made apparent hereinafter.

According to my present invention, I provide electric decelerometer apparatus associated with the wheel units of each wheel truck for the purpose of controlling the magnet valve device 19 of the corresponding wheel truck in a manner to cause it to effect a reduction of the fluid pressure in the brake cylinders in response to the inception of slipping of any of wheels of that truck. The electric decelerometer apparatus comprises two direct-current generators 28a and 28b for each wheel truck, the generator 28a having its armature driven according to the rotation of one wheel unit and the generator 28b having its armature driven according to the rotation of the other wheel unit. Any desired arrangement for driving the armatures of the generators may be employed, for example the generators may be mounted in the journal casing at the end of an axle and coupled in coaxial relation to the end of axle in the manner indicated in the drawing.

The generators 28a and 28b may be of any suitable type for producing a voltage substantially proportional to the rotational speed of the corresponding wheel unit. In the present instance, it will be assumed that the generators 28a and 28b have permanent magnet field cores, thereby eliminating the necessity for field windings. In a generator of this type, the polarity of the voltage at the terminals of the generator reverses automatically with a reversal in the direction of rotation of the armature for reasons well known.

The electric decelerometer apparatus for each wheel truck further includes two electric relays 29a and 29b and two electrical condensers 30a and 30b.

Relays 29a and 29b are of the so-called uni-directional type having two separate windings $p$ and $h$ respectively. These relays may be identical but for purposes of the present application, relay 29a is shown as having a front contact $c$ and a back contact $d$ while the relay 29b has only a front contact $c$. Relays 29a and 29b are referred to as uni-directional relays because of the characteristic operation thereof, namely the operative response or pick-up thereof only response to the flow of current exceeding a certain value and flowing through either winding $p$ or $h$ in one certain direction, the flow of current through the windings in the opposite direction being ineffective to cause pick-up of the relay contacts or effective to restore the contacts to the dropped-out position thereof.

The winding $p$, hereinafter referred to as the pick-up winding, of each relay 29a and 29b is connected in series relation with the corresponding condenser 30a or 30b across the terminals of the corresponding generator 28a or 28b.

In order to effect the proper operation of the relays 29a and 29b notwithstanding the reversal of the polarity of the voltage of the terminals of the generators 28a and 28b, any suitable reversing switch mechanism may be provided. For purposes of illustration, I have shown a reversing relay 33 of the polarized type having a winding $a$ connected across the terminals of one of the generators, such as the generator 28a of wheel truck 11, and a plurality of pairs of reversing contacts $b$ and $c$, each pair of contacts being effective to reverse connections to the terminals of the corresponding generator automatically in response to a reversal of polarity at the terminals of the generator.

For purposes of the present invention, it will be assumed that the polarity of the voltage at the terminals of the generators during forward travel of the vehicle is such as to cause the contacts $b$ and $c$ of reversing relay 33 to be maintained in their dropped-out position shown and that a reverse travel of the car causes the contacts to be actuated to their respective picked-up positions. As usual in the case of polarized relays, the contacts of the reversing relay 33 remain in the position to which they are last actuated, independently of continued energization of the winding of the relay, until the direction of current through the winding is reversed.

It will be apparent that when the car is traveling at a constant speed, the condensers 30a and 30b for each wheel truck are charged to the voltage delivered by the corresponding generator 28a and 28b respectively. Upon acceleration of the car, current is supplied to charge the respective condensers through the pick-up winding $p$ of the corresponding relay 29a or 29b, the current varying substantially in proportion to the rate of increase of voltage delivered by the generators and, therefore, substantially in proportion to the rate of acceleration of the corresponding car wheels.

The connections of the pick-up winding $p$ of the relays 29a and 29b are such that the direction of flow of condenser charging current therethrough is such as to maintain the contacts of the relays in their dropped-out position or to tend to restore them to their dropped-out position. Thus the relays 29a and 29b are not picked-up in response to acceleration of the car.

When the car decelerates, each of the condensers 30a and 30b discharges a current through the corresponding pick-up winding $p$ of the corresponding relay 29a or 29b, the current discharged being substantially proportional to the rate of reduction of the voltage at the terminals of the corresponding generators, and therefore, substantially proportional to the rate of deceleration of the wheels of the corresponding wheel unit. In this instance, the direction of flow of current discharged from the condensers is in a proper direction to tend to cause pick-up of the contacts of the relays.

The windings $p$ of the relays 29a and 29b are so designed that as long as the wheels of the corresponding wheel unit decelerate at a normal or non-slipping rate, for example a rate not exceeding four miles per hour per second, the current energizing the winding $p$ is insufficient to cause pick-up of the contacts of the corresponding relay.

Whenever the current discharged from the condensers 30a and 30b through the corresponding pick-up winding $p$ exceeds a certain value occurring only when the corresponding wheel unit rotatively decelerates at a rate exceeding a certain rate, such as ten miles per hour per second, the contacts of the relay are actuated to their picked-up position. Such a high rate of deceleration of the car wheels is never attained unless the wheels are slipping. Thus relays 29a and 29b are never picked-up unless the corresponding wheel unit slips.

The winding $h$ of each of the relays 29a and 29b is a self-holding winding effective when energized to maintain the contacts of the relays in their picked-up position notwithstanding the deenergization of the pick-up winding $p$ of the same relay or energization thereof by a condenser charging current, as when the corresponding wheel unit accelerates back toward vehicle speed during a slipping cycle thereof.

The holding winding $h$ of the relay 29b for each wheel truck is not employed for any useful purpose in the system of my present invention. It is shown for the purpose of indicating the similar operating characteristics of the two relays 29a and 29b. As a practical matter, the two relays 29a and 29b may be identical.

In accordance with my present invention, the electric decelerometer apparatus which I have provided further includes an electric relay 34 and an associated electrical condenser 35 arranged and connected in a manner presently to be described for the purpose of controlling an energizing circuit including the self-holding winding $h$ of the relay 29a for the corresponding wheel truck as well as the magnet winding 23 of the magnet valve device 19 for the corresponding wheel truck.

The relay 34 is a conventional relay of the simple neutral type of a winding $a$ and a single front contact $b$, the winding being of relatively high resistance for a purpose hereinafter to be explained.

Condenser 35 is connected in shunt relation to the winding $a$ of relay 34.

The winding $a$ of the relay 34 is included in a circuit extending from a bus wire 37 connected to the positive terminal of a source of direct-current, such as a storage battery 38, thence by way of a wire 39 including in series relation therein the back contact $d$ of relay 29a, winding $a$ of relay 34, the contacts of pressure switch 26, and magnet winding 23 of magnet valve device 19 to a bus wire 41 connected to the negative terminal of the storage battery 38.

Assuming that the back contact $d$ of relay 29a is in its dropped-out position, the closure of the contacts of the pressure switch 26 establishes a circuit for energizing the winding $a$ of relay 34 as well as the winding 23 of the magnet valve device 19. However, due to the relatively high resistance of the winding $a$ of relay 34, the current while sufficient to cause pick-up of the contact $b$ of the relay 34 is insufficient to effect operation of the double beat valve 21 of the magnet valve 19 to its right-hand seated position.

Being connected in shunt relation to the winding $a$ of relay 34, the condenser 35 is charged to the voltage across the terminals of the winding of the relay 34.

The holding winding $h$ of the relay 29a is connected in series relation with the parallel-connected contacts $c$ of the two relays 29a and 29b and the contact $b$ of relay 34 in a wire 43 that is connected at one end to the positive battery wire 37 and at the other end to the wire 39 at a point between the winding $a$ of relay 34 and the contacts of the pressure switch 26.

The resistance of the winding $h$ of relay 29a is relatively low compared to the resistance of the winding $a$ of relay 34 and consequently, upon the pick-up of the contact $c$ of either of the relays 29a or 29b, the current energizing the winding $h$ of the relay 29a is not only sufficient to cause pick-up of the contact of relay 29a but also sufficient to energize the magnet winding 23 of the magnet valve device 19 to a sufficient degree to actuate the double beat valve 21 to its right-hand seated position.

Obviously, if energization of the holding winding $h$ of relay 29a is effected in response to the pick-up of the contact $c$ of the relay 29a, energization of the holding winding $h$ is effective merely to maintain the contacts of the relay 29a in their picked-up position.

It will thus be apparent that the contacts of the relay 29a are always picked-up in response to the occurrence of a slipping condition of either of the wheel units of the corresponding truck while the contact $c$ of the relay 29b is picked-up only in the event of the occurrence of a slipping condition of the corresponding wheel unit.

*Operation of embodiment shown in Figure 1*

Let it be assumed that a car having the equipment shown in Fig. 1 is traveling under power with the brake valve handle 17a in its brake release position so that the brakes are released and that the operator desires to bring the car to a stop. To do so he first shuts off the propulsion power in the usual manner and then shifts the brake valve handle 17a out of its brake release position into its application zone an amount corresponding to the desired degree of brake application. Control pipe 15 and brake cylinders 14 are thus charged to a corresponding pressure and the brakes are thus applied on the wheels to a corresponding degree.

Pressure switches 26 are actuated to their closed positions in response to the control pressure established in the control pipe 15. Thus when the brakes are first applied the relay 34 for each truck is actuated to its picked-up position and each condenser 35 is charged to a corresponding voltage. Such pick-up of relay 34 and charging of condensers 35 is without immediate effect, the function by the relays 34 and condensers 35 being evidenced under circumstances presently to be described.

As long as the wheels of the vehicle do not slip no variation of the pressure in the brake cylinders 14 occurs except in accordance with variation of the pressure in the control pipe 15 under the control of the operator by means of the brake valve 17. If, however, when an application of the brakes is initiated or at any time during a brake application, one or more of the wheel units begin to slip, a further operation occurs which will now be described.

Let it be assumed that the wheels of the right-hand wheel unit of truck 11 begin to slip while the brakes are applied. In such case, therefore, the voltage of the corresponding generator 28b rapidly reduces and the condenser 30b accordingly discharges current through the pick-up winding $p$ of relay 29b to cause the contact $c$ thereof to be actuated to its picked-up position.

The contact $c$ of relay 29b is effective in its picked-up position to establish the circuit previously described for energizing the holding winding $h$ of the relay 29a and at the same time that of the magnet winding 23 of the magnet valve device 19 for the wheel truck 11. It will be understood that when the pressure switch 26 was first closed in response to the application of the brakes, the contact $b$ of relay 34 was actuated to its picked-up position but that the magnet winding 23 of the magnet valve device 19 was not sufficiently energized at such time to be operated out of its normal position in which it is shown.

Upon the sufficient energization of the magnet winding 23 of the magnet valve device 19, the double beat valve 21 is actuated to its right-hand seated position closing the communication through the branch pipe 15a and establishing the communication through which fluid under pressure is vented from the brake cylinders 14 for wheel truck 11 through the exhaust port 24, thereby effecting a rapid reduction in the degree of application of the brakes associated with the wheels of truck 11.

In normal circumstances, the magnet winding 23 of the magnet valve device 19 remains energized until such time as the pressure in the brake cylinders 14 reduces below fifteen pounds per square inch, thereby causing operation of the contacts of the pressure switch 26 to open position to interrupt the circuit for energizing the magnet winding 23. Ordinarily, the reduction of the pressure in the brake cylinders 14 to below fifteen pounds per square inch requires a certain length of time such as one or one and one-half seconds. Moreover, the slipping wheels respond so quickly to the reduction in the fluid pressure in the brake cylinders as to cease deceleration and accelerate back toward a speed corresponding to car speed within the interval of time during which the pressure in the brake cylinders is reducing to below fifteen pounds per square inch.

Accordingly, when the pressure switch 26 opens to effect the deenergization of the magnet winding 23 of magnet valve device 19, further venting of fluid under pressure from the brake cylinders is at once terminated and the communication through branch pipe 15a for resupplying fluid under pressure to the brake cylinders is reestablished.

Accordingly, venting of fluid under pressure from the brake cylinders 14 is terminated and fluid under pressure is resupplied to the brake cylinders through the branch pipe 15a in response to the deenergization of the magnet winding 23 of magnet valve device 19, under ordinary circumstances, substantially at the time or after the time that the slipping wheel units have been fully restored to a speed corresponding to car speed.

If, however, due to some reason such as the failure of pressure switch 26 to be restored properly to its open position in response to the reduction of brake cylinder pressure to below fifteen pounds per square inch, the magnet winding 23 of the magnet valve device 19 is not deenergized, the fluid under pressure in the brake cylinder 14 will be completely vented to atmosphere so that the brakes would remain released. This undesired result is prevented by operation of the relay 34 in the manner now to be described.

As previously indicated, the contacts of the relay 29a were actuated to their picked-up positions in response to the energization of the holding winding h of relay 29a caused by the pick-up of the contact c of the relay 29b. The actuation of the back contact d of relay 29a to its picked-up or open position interrupts the circuit for energizing the winding a of the relay 34. The contact b of the relay 34, however, is not restored immediately to its dropped-out position because of the slow-release characteristic of the relay 34 produced by the current discharged from condenser 35 locally through the winding a of relay 34. The capacity of the condenser 35 is such in relation to the resistance of the winding a of the relay 34 that the condenser current discharged through the winding a of the relay 34 dies away sufficiently gradually that the current is sufficient to maintain the contact b of the relay 34 picked-up for an interval of time slightly greater than the maximum normal time that the contacts of the pressure switch 26 remain closed following the initiation of the reduction of the brake cylinder pressure by operation of the magnet valve device 19.

If, therefore, the pressure switch 26 does not open properly in response to the reduction of the pressure in the brake cylinders below fifteen pounds per square inch in the normal intended manner, the circuit for energizing the magnet winding 23 of the magnet valve device 19 is interrupted in any event in response to the drop-out of the contact b of relay 34 a slight interval of time after the time that the pressure switch 26 would ordinarily have interrupted the energizing circuit.

It will thus be seen that in the embodiment shown in Fig. 1 the pressure switch 26 is intended to operate normally to interrupt the energizing circuit for the magnet winding 23 and that the slow drop-out relay 34 does so only in the event that the pressure switch 26 fails to do so within the drop-out time of the relay.

Upon the resupply of fluid under pressure to the brake cylinders 14 of wheel truck 11 following the restoration of the magnet valve 23 to its normal left-hand position, the brakes are reapplied to a degree corresponding to the pressure established in the control pipe 15. The resupply of fluid under pressure to the previously vented brake cylinders 14 tends to cause a reduction of the pressure in the control pipe 15. However, due to the pressure-maintaining feature of the brake valve 17, the pressure is maintained in the control pipe.

The restoration of pressure in the brake cylinders 14 to above fifteen pounds per square inch causes the contacts of pressure switch 26 to again be restored to closed positions. However, due to the fact that the contacts of the relay 29a were restored to their dropped-out positions in response to deenergization of the holding winding h of the relay 29a when the contact b of the relay 34 was restored to its dropped-out position and due also to the fact that the contact c of the relay 29b was restored to its dropped-out position when the slipping wheel unit ceased to decelerate at a rate exceeding a certain low rate, the magnet winding 23 of the magnet valve 19 is not again energized until such time as either one or both of the relays 29a and 29b are again picked-up in response to possible subsequent slipping of the corresponding wheel units.

The electric decelerometer control apparatus for wheel truck 12 is identical to that for wheel truck 11 and accordingly a description of the operation of such equipment will be readily understood from the previous description.

When the car comes to a complete stop, the relays 29a and 29b are always restored to their dropped-out positions. Consequently the magnet valve device 19 is always restored to its normal position shown, in which fluid under pressure is supplied to the brake cylinders to maintain the brakes applied. In order to start the car again, the operator must therefore restore the brake valve handle 17a to its brake release position to release the brakes.

If the car travels in a direction opposite to that assumed in the previous description, the contacts of the reversing relay 33 are actuated to their respective picked-up positions, thereby reversing the connections to the terminals of the generators 28a and 28b. It will thus be apparent that notwithstanding a reversal in the direction of rotation of the car wheels and a consequent reversal of polarity of the voltage at the terminals of the generators, the condensers 30a and 30b are always subject to a charging voltage of uniform polarity so that the proper direction of flow of current through the pick-up winding p the relays 29a and 29b to pick-up the relays occurs in response to the deceleration of the vehicle wheels.

Figure 2:
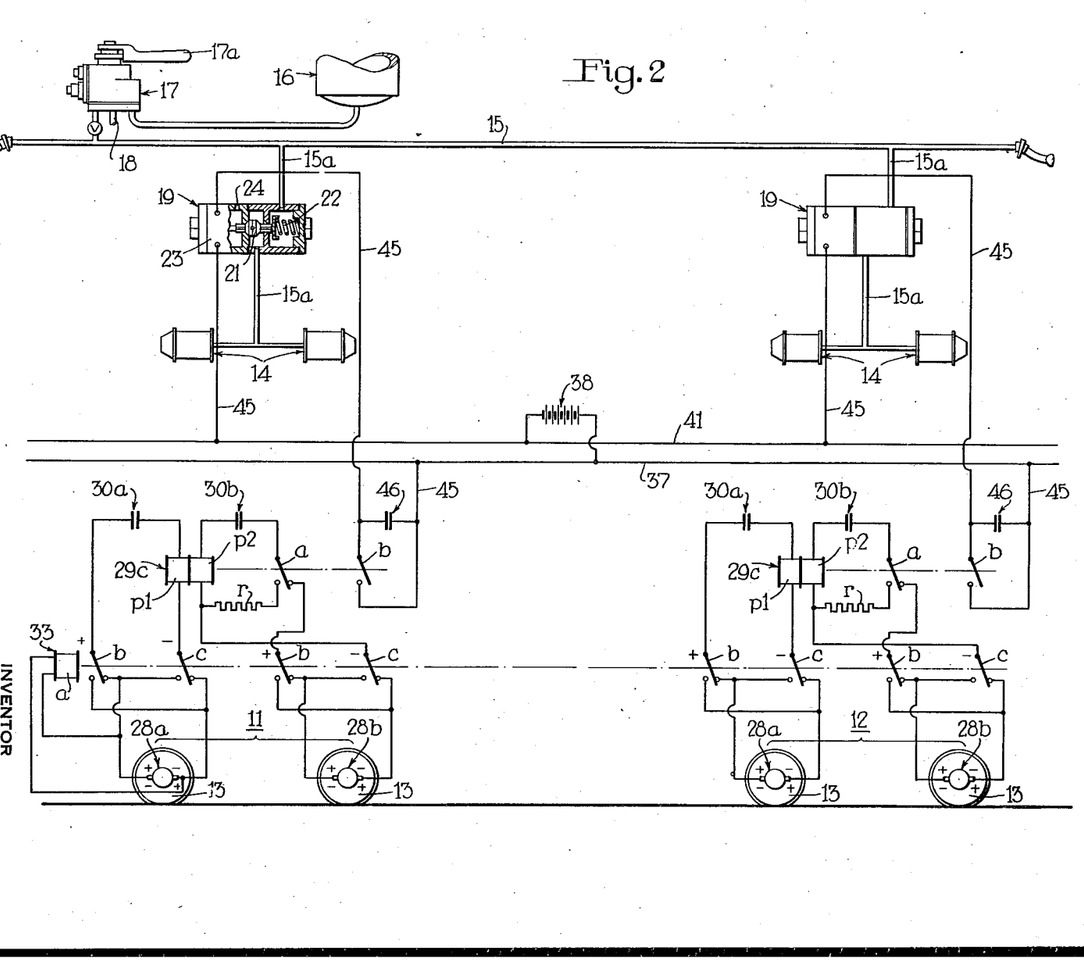
Fig. 2 is a simplified diagrammatic view, showing a vehicle brake control system embodying another form of my invention.

*Embodiment shown in Figure 2*

The vehicle brake control apparatus shown in Fig. 2 differs in certain respects, presently to be pointed out, from the equipment shown in Fig. 1. For simplicity of description, those parts in the equipment of Fig. 2 which are identical to corresponding parts in Fig. 1 are identified by the same reference numeral without description. Accordingly, only so much of the equipment shown in Fig. 2 as differs specifically from that of Fig. 1 will be described.

The equipment shown in Fig. 2 differs essentially from that of Fig. 1 in omitting the brake cylinder pressure responsive switches 26, substituting a single relay 29c for the two relays 29a and 29b of Fig. 1, and omitting the slow-acting relay 34 and its associated condenser 35.

The two condensers 30a and 30b are employed in Fig. 2 also but as will be presently explained the connections thereof differ from those in Fig. 1.

The relay 29c is similar to the relays 29a and 29b, being a uni-directional relay having two separate windings p1 and p2, a transfer contact a, and a front contact b. The windings are of different design than the windings of the relays 29a and 29b for reasons hereinafter explained.

The windings p1 of relay 29c is connected in series relation with the condenser 30a across the terminals of the axle-driven generator 28a under the control of the corresponding pair of contacts b and c of the reversing relay 33. In a similar manner, the winding p2 of relay 29c is connected in series relation with condenser 30b and the transfer contact a of the relay 29c across the terminals of the axle-driven generator 28b under the control of the corresponding pair of contacts b and c of the reversing relay 33.

Each of the separate windings of the two relays 29a and 29b of Fig. 1 is so designed as to be effective in and of itself to produce sufficient magnetomotive force to cause pick-up of the contacts of the relay whenever the corresponding wheel unit rotatively decelerates at a rate exceeding a certain slipping rate, such as ten miles per hour per second. In the case of the relay 29c, however, the separate windings p1 and p2 are simultaneously and separately energized under normal conditions by a current substantially proportional to the rate of acceleration or the rate of deceleration of the corresponding wheel unit. It is necessary, therefore, that the separate windings of relay 29c be of different design than the separate windings of relays 29a and 29b. More specifically, it is necessary that the separate windings of relay 29c have a lesser number of turns and/or a higher resistance than the windings of relays 29a and 29b in order that the combined number of ampere-turns of both windings p1 and p2, produced in response to the maximum non-slipping rate of rotative deceleration of the corresponding wheel units, be insufficient to produce a magnetomotive force great enough to cause pick-up of the contacts of the relay.

The design of the windings of relay 29c is, moreover, such that a magnetomotive force sufficient to pick-up the contacts of the relay is not produced in response to the combined number of ampere-turns of the two windings unless one or both of the windings are energized by a current discharged from the corresponding condenser 30a or 30b at the time the corresponding wheel unit or units rotatively decelerate at a rate exceeding a certain slipping rate, such as ten miles per hour per second.

It will thus be seen that the contacts of the relay 29c are picked-up only in response to the rotative deceleration of either one or both of the wheel units of the corresponding wheel truck at a rate exceeding a certain slipping rate.

An arrangement similar to that including the relay 29c is disclosed in the prior copending joint application, Serial No. 432,188 of Douglas R. Borst and the present applicant, filed February 25, 1942, and accordingly such arrangement is not broadly claimed herein as the sole invention of the present applicant.

The transfer contact a of the relay 29c is effective when actuated to its picked-up position to interrupt the connections of the winding p2 and the condenser 30b to the terminals of the corresponding generator 28b, and at the same time establish a local discharge circuit including a discharge resistor r the function of which will be more fully described presently.

Contact b of relay 29c is a front contact which is included in series relation with the magnet winding 23 of the corresponding magnet valve device 19 in a wire 45 having its opposite ends connected to the battery bus wires 37 and 41. Accordingly it will be seen that the contact b of relay 29c is effective in its picked-up or closed position to cause energization of the magnet winding 23 of the magnet valve device 19.

A condenser 46 is connected in shunt relation to the contact b of relay 29c for the purpose of minimizing arcing at the contact b when the contact b is restored to its dropped-out position interrupting the energizing circuit for the magnet winding 23 of the magnet valve device 19.

Application and release of the brakes may be effected under the control of the operator by means of the brake valve 17 in exactly the same manner as described in connection with Fig. 1 and accordingly a description of such operation is not repeated herein.

Let it be assumed now that when a brake application is initiated or at any time during a brake application, the right-hand wheel unit of wheel truck 11 begins to slip. In such case, the winding p2 of the relay 29c is energized by current discharged from the condenser 30b sufficient to cause pick-up of the contacts of the relay 29c and these contacts are accordingly actuated to their respective picked-up positions.

The contact b of the relay 29c is effective in its picked-up (closed) position to establish the circuit for energizing the magnet winding 23 of the magnet valve device 19 for the corresponding wheel truck 11. The magnet valve device 19 accordingly operates to rapidly vent fluid under pressure from the brake cylinders 14 in the manner similar to that described above in connection with the equipment of Fig. 1 and continues to reduce the pressure in the brake cylinders so long as the energizing circuit for the magnet winding 23 is maintained.

The transfer contact a of relay 29b is effective in its picked-up position to establish the local discharge circuit, including the resistor r, for condenser 30b. The current discharged from the condenser 30b continues to flow for a certain length of time during which it constantly decreases at a rate determined by the impedance characteristics of the discharge circuit. The winding p2 of the relay 29c thus continues to be energized to a sufficient degree to maintain the contacts of the relay 29c in their picked-up positions for a certain interval of time following the initial pick-up thereof. This interval of time is preferably sufficiently long to enable the slipping wheel unit to be fully restored to a speed corresponding to vehicle speed.

It will be observed that the connection between the winding p2 and its corresponding generator 28b is interrupted by the contact a of the relay 29c in its picked-up position. Thus, when the slipping wheel ceases to decelerate and begins to accelerate back toward a speed corresponding to car speed as a result of the reduction in brake cylinder pressure caused by energization of the magnet winding 23 of the magnet valve device 19, the winding p2 is not energized by a condenser-charging current. Consequently, in view of the fact that the winding p1 of the relay 29b continues to remain energized by a current proportional to the rate of deceleration of the non-slipping wheel unit with which the generator 28a is associated, it will be seen that the contacts of the relay 29c remain in their respective picked-up positions until such time as the condenser discharge current flowing through the winding p2 of relay 29c reduces sufficiently that the total number of ampere-turns of the two windings p1 and p2 is insufficient to maintain the contacts of the relays in their respective picked-up positions.

Upon the restoration of the contacts of relay 29c to their dropped-out positions, the magnet winding 23 of the magnet valve device 19 is deenergized by the opening of the contact b; and the winding p2 and condenser 30b are reconnected across the terminals of the corresponding axle-driven generator 28b by contact a which at the same time interrupts the local discharge circuit including the discharge resistor r.

Upon the deenergization of the magnet winding of the magnet valve device 19, fluid under pressure is resupplied to the brake cylinders 14 from the control pipe 15 in the same manner described for Fig. 1 to effect the reapplication of the brakes.

If the left-hand wheel unit of wheel truck 11 begins to slip during a brake application while the right-hand wheel unit does not, it will be seen that the relay 29c is picked-up in response to the energization of the winding p1 of relay 29c by the corresponding current discharged from the condenser 30a. Thereafter, the operation is substantially identical to that previously described, the contacts of the relay 29c being maintained in their picked-up positions for a certain length of time due to the energization of the winding p2 of the relay by current discharged from the condenser 30b through the local discharge circuit including the resistor r.

In this instance, however, the interval of time that the relay 29c remains picked-up is slightly shorter than in the previous instance for the reason that the winding p1 of the relay 29b is energized by a current flowing therethrough to charge the condenser 30a when the slipping wheel unit accelerates back toward a speed corresponding to car speed. Thus the total number of ampere-turns of the two windings p1 and p2, below which the contacts of the relay 29c will be restored to their dropped-out positions is attained somewhat sooner than in the previous instance.

If both of the wheel units of wheel truck 11 slip simultaneously, the relay 29c is picked-up due to the simultaneous energization of the windings p1 and p2 by current discharged from the two condensers 30a and 30b. The time interval during which the contacts of relay 29c are maintained in their picked-up positions is substantially the same as when the relay 29c is picked-up in response to the slipping of only the left-hand wheel unit.

The operation of the electric decelerometer brake control apparatus for wheel truck 12 in Fig. 2 is identical to that described for wheel truck 11 and a description thereof is accordingly not repeated.

*Summary*

Summarizing, it will be seen that I have disclosed a vehicle brake control equipment including two different arrangements for initiating a reduction in the degree of application of the brakes substantially at the instant one or more wheel units of the vehicle begins to slip and for continuing the reduction for a certain length of time before terminating the reduction and initiating the reapplication of the brakes.

In one form of my invention, means responsive to the reduction of the pressure in the brake cylinders to below a certain pressure normally operates to terminate the reduction of brake cylinder pressure initiated in response to a wheel-slip condition and to effect the reapplication of the brakes. If the brake cylinder pressure responsive means fails to operate in its normal intended manner, the reduction of brake cylinder pressure is terminated and reapplication of the brakes initiated by an electrical timing mechanism including a slow drop-out relay at the expiration of a certain length of time.

In another embodiment of my invention, the duration of the reduction of brake cylinder pressure initiated in response to a wheel-slip condition is controlled entirely by an electrical timing means independently of the degree of reduction of the pressure in the brake cylinders.

Having now described my invention, what I claim as new and desire to secure by Letters Patent is:—

1. In a vehicle brake control equipment of the type having means under the control of the operator for effecting application and release of the brakes associated with the wheels of the vehicle, the combination of an electrical relay having two separate windings, means for supplying an energizing current to one of said windings to cause pick-up of the relay in response to the slipping of a certain wheel unit of the vehicle, a normally charged condenser, means responsive to the pick-up of said relay for initiating the discharge of current from said condenser, means for energizing the other of the windings of said relay to maintain said relay picked-up for a certain limited time during which the current discharged from the condenser exceeds a certain value, and means controlled by said relay effective to initiate a continuing reduction in the degree of application of the brakes associated with said wheel unit in response to the pick-up of said relay and operative to terminate the reduction and initiate an increase in the degree of application of the brakes associated with said wheel unit upon the drop-out of said relay.

2. In a vehicle brake control system, the combination of a relay having two separate windings, means for energizing one of said windings of said relay by a current substantially proportional to the rate of rotative deceleration of a wheel unit of the vehicle, said one winding being effective to cause pick-up of the relay only when energized by a current exceeding a certain value which occurs only when the wheel unit decelerates at a rate exceeding a certain rate while slipping, a normally charged condenser, means responsive to pick-up of said relay for causing said condenser to discharge current, means for causing the other of the windings of said relays to be energized to a degree sufficient to maintain said relay picked-up for a limited time corresponding to the length of time that the current discharged from said condenser exceeds a certain degree, and means controlled by said relay effective during an application of the brakes to cause a continuing reduction in the degree of application of the brakes associated with said wheel unit only so long as said relay remains picked-up.

3. In a vehicle brake control equipment of the type in which the brakes associated with the vehicle wheels are applied and released under the control of the operator of the vehicle, the combination of control means operative to effect reduction in the degree of application of the brakes associated with a wheel unit of the vehicle, means responsive to the slipping of said wheel unit for causing a continuing operation of said control means, means controlled according to the degree of application of the brakes associated with said wheel unit and effective in its normal manner of operation to cause said control means to terminate further reduction in the degree of application of the brakes when the degree of application of the brakes reduces below a certain value, a normally charged condenser, means controlled by said wheel slip responsive means and effective upon slipping of said wheels for causing said condenser to discharge current therefrom, and means responsive to the diminution of the current discharged from said condenser to below a certain value for causing said control means to terminate the reduction in the degree of application of the brakes if such reduction is not sooner terminated in response to the operation of said application controlled means.

4. In a vehicle brake control equipment of the type having a brake cylinder to which fluid under pressure is supplied to effect application of the brakes and from which fluid under pressure is released to effect release of the brakes associated with a wheel unit of the vehicle, the combination of valve means normally in a position to permit the supply of fluid under pressure to said brake cylinder and operative to a different position to effect interruption of the supply of fluid under pressure to the brake cylinders and the rapid exhaust of fluid under pressure therefrom, means responsive to the slipping of said wheel unit for effecting operation of said valve means to said different position, means responsive to the reduction of pressure in said brake cylinder below a certain value for causing restoration of said valve means from its said different to its said normal position, a normally charged condenser, means controlled by said wheel slip responsive means and effective upon slipping of said wheel unit for causing said condenser to discharge current therefrom, and means responsive to the diminution of the current discharged from said condenser to below a certain value for causing restoration of said valve means to its normal position if such restoration is not sooner effected in response to the operation of said brake cylinder pressure responsive means.

5. In a vehicle brake control equipment of the type in which the brakes associated with the vehicle wheels are applied and released under the control of the operator of the vehicle, the combination of control means operative to effect reduction in the degree of application of the brakes associated with a wheel unit of the vehicle, a relay having two separate windings, means for energizing one of the windings of said relay to cause pick-up of the relay only when the said wheel unit begins to slip, said relay being effective when picked-up to cause operation of said control means to initiate a continuing reduction in the degree of application of the brakes associated with said wheel unit, means responsive to reduction in the degree of application of the brakes associated with said wheel unit to below a certain degree effective in its normal manner of operation to cause said control means to terminate further reduction in the degree of application of the brakes associated with said wheel unit and initiate an increase in the degree of application of the brakes associated with said wheel unit, a normally charged condenser, means effective in response to the pick-up of said relay to cause said condenser to discharge current therefrom, means effective to energize the other winding of said relay to maintain the relay picked-up for a certain limited time corresponding to the time that the current discharged from the condenser exceeds a certain value, said relay being effective when restored to its dropped-out position to cause said control means to terminate further reduction in the degree of application of the brakes and initiate an increase in the degree of application of the brakes associated with said wheel unit in the event that such operation is not sooner effected by said brake application responsive means.

6. In a vehicle brake control equipment of the type in which the brakes associated with the vehicle wheels are applied and released under the control of the operator of the vehicle, the combination of control means operative to effect reduction in the degree of application of the brakes associated with a wheel unit of the vehicle, a relay having two separate windings, means for causing energization of one of the windings of said relay by a current substantially proportional to the rate of rotative deceleration of a wheel unit of the vehicle, said winding being effective to cause pick-up of the relay only when energized by a current exceeding a certain value corresponding to a rate of deceleration of the wheel unit occurring only when the wheel slips, said relay being effective when picked-up to cause operation of said control means to initiate a continuing reduction in the degree of application of the brakes associated with said wheel unit, means responsive to reduction in the degree of application of the brakes associated with said wheel unit to below a certain degree effective in its normal manner of operation to cause said control means to terminate further reduction in the degree of application of the brakes associated with said wheel unit and initiate an increase in the degree of application of the brakes associated with said wheel unit, a normally charged condenser, means effective in response to the pick-up of said relay to cause said condenser to discharge current therefrom, means effective to energize the other winding of said relay to maintain the relay picked-up for a certain limited time corresponding to the time that the current discharged from the condenser exceeds a certain value, said relay being effective when restored to its dropped-out position to cause said control means to terminate further reduction in the degree of application of the brakes and initiate an increase in the degree of application of the brakes associated with said wheel unit in the event that such operation is not sooner effected by said brake application responsive means.

7. In a vehicle brake control equipment of the type having a brake cylinder to which fluid under pressure is supplied and from which fluid under pressure is released for effecting the application and release of the brakes associated with a wheel unit of the vehicle, the combination of valve means normally in a position to permit the supply of fluid under pressure to said brake cylinder and operative to a different position to interrupt the supply of fluid under pressure to the brake cylinder and effect the rapid exhaust of fluid under pressure therefrom, an electrical relay having two separate windings, means for energizing one of the windings of said relay to cause pick-up of the relay when a wheel unit of the vehicle begins to slip, said relay being effective when picked-up to cause operation of the valve means to its different position, means responsive to the reduction of the pressure in the said brake cylinder below a certain value for causing restoration of the valve means to its normal position, a normally charged condenser, means responsive to the pick-up of said relay for causing current to be discharged from said condenser, and means for causing energization of the other of the windings of said relay by a current sufficient to maintain said relay picked-up for a certain length of time correspondingly to the time that the current discharged from the condenser exceeds a certain value, said relay being restored to its dropped-out position at the expiration of such certain length of time and effective upon restoration to its dropped-out position to cause said valve means to be restored to its normal position if the brake cylinder pressure responsive means has not sooner operated to cause restoration of the valve means to its normal position.

8. In a vehicle brake control equipment of the type having a brake cylinder to which fluid under pressure is supplied and from which fluid under pressure is released for effecting the application and release of the brakes associated with a wheel unit of the vehicle, the combination of valve means normally in a position to permit the supply of fluid under pressure to said brake cylinder and operative to a different position to interrupt the supply of fluid under pressure to the brake cylinder and effect the rapid exhaust of fluid under pressure therefrom, an electrical relay having two separate windings, means for causing energization of one winding of said relay by a current substantially proportional to the rate of rotative deceleration of a wheel unit of the vehicle, said winding being effective to cause pick-up of said relay only when energized by current exceeding a certain value and corresponding to a certain rate of rotative deceleration of the wheel unit occurring only when the wheel slips, said relay being effective when picked-up to cause operation of the valve means to its different position, means responsive to the reduction of the pressure in the said brake cylinder below a certain value for causing restoration of the valve means to its normal position, a normally charged condenser, means responsive to the pick-up of said relay for causing current to be discharged from said condenser, and means for causing energization of the other of the windings of said relay by a current sufficient to maintain said relay picked-up for a certain length of time correspondingly to the time that the current discharged from the condenser exceeds a certain value, said relay being restored to its dropped-out position at the expiration of such certain length of time and effective upon restoration to its dropped-out position to cause said valve means to be restored to its normal position if the brake cylinder pressure responsive means has not sooner operated to cause restoration of the valve means to its normal position.

9. In a vehicle brake control equipment of the type in which the brakes associated with the vehicle wheels are applied and released under the control of the operator of the vehicle, the combination of an electrical relay having a pick-up winding and a holding winding, means for causing energization of the pick-up winding to cause pick-up of the relay only when a certain wheel unit of the vehicle begins to slip, a second relay having a winding which is normally energized under the control of the first said relay in the dropped-out position thereof to cause pick-up of said second relay, an electrical condenser connected in shunt relation with the winding of said second relay and normally charged in accordance with the voltage across the winding of said second relay, the first said relay being effective when picked-up to cause deenergization of the winding of said second relay, and to cause said condenser to discharge a current exceeding a certain value for a certain length of time through the winding of said second relay to maintain the said second relay in a picked-up position for said certain length of time, the first said relay being effective when picked-up as long as the said second relay is picked up for causing energization of the other winding of said relay to a degree sufficient to maintain the first said relay picked-up, and control means effective in response to the pick-up of the first said relay to initiate a continuing reduction in the degree of application of the brakes associated with said wheel unit and operative to terminate further reduction in the degree of application of the brakes and initiate an increase in the degree of application of the brakes associated with said wheel unit upon the restoration of the first said relay to its dropped-out position.

10. In a vehicle brake control equipment of the type having a brake cylinder to which fluid under pressure is supplied and from which fluid under pressure is released to effect application and release respectively of the said brakes associated with a wheel unit of the vehicle, the combination of valve means normally in a position to permit the supply of fluid under pressure to said brake cylinder and operative to a different position to effect interruption of the supply of fluid under pressure to the brake cylinder and the rapid exhaust of fluid under pressure therefrom, an electrical relay having two separate windings, means for energizing one of the windings of said relay to cause pick-up of the relay only when said wheel unit begins to slip a second relay which is picked-up as long as the first said relay is in its dropped-out position and which is restored to its dropped-out position at the expiration of a certain length of time following the pick-up of the first said relay, the first said relay and the said second relay being jointly effective in their picked-up positions to cause energization of the other winding of the first said relay to maintain the first said relay in its picked-up position for a certain limited time corresponding to the drop-out time of said second relay, the first said relay and second relay being jointly effective in their picked-up positions to cause operation of the said valve means to its said different position, pressure responsive means effective in its normal manner of operation to cause restoration of the valve means to its said different position in response to the reduction of the pressure in the brake cylinder below a certain value within the drop-out of said second relay, said second relay being effective upon restoration to its dropped-out position at the expiration of its drop-out time to cause restoration of the said valve means to its said normal position if the brake cylinder pressure responsive means is not sooner operated to restore the valve means to its said normal position.

11. In a brake control equipment for a vehicle having two separately rotatable wheel units, the combination of two electrical relays, one of said relays having a pick-up winding and a holding winding and the second of said relays having a pick-up winding, means for energizing the pick-up winding of said one relay to cause pick-up of the relay only when a corresponding one of the wheel units begins to slip, means for energizing the pick-up winding of said second relay only when the other wheel unit begins to slip, a third relay which is normally picked-up under the control of the first said relay as long as the first relay is in its dropped-out position and which is restored to its dropped-out position at the expiration of a certain length of time following pick-up of the said first relay, said first and said second relays being effective when picked-up while said third relay is picked-up for causing energization of the holding winding of the said first relay to maintain the first said relay picked-up or to pick-up said first relay, electroresponsive valve means adapted to be energized under the joint control of said first and said third relays while both said first and said third relays are picked-up and to be deenergized in response to the drop-out of said third relay at the expiration of its drop-out time, said electro-responsive valve means being effective when energized to cause a continuing reduction in the degree of application of the brakes associated with said wheel unit and when deenergized to cause an increase in the degree of application of the brakes associated with said wheel unit.

12. In a vehicle brake control equipment of the type having brake cylinder means to which fluid under pressure is supplied to effect application of the brakes and from which fluid under pressure is released to effect release of the brakes associated with a plurality of wheel units, the combination of a first relay, means for causing pick-up of said first relay whenever any one of the wheel units begins to slip, electroresponsive valve means adapted to be energized in response to the pick-up of said first relay to cause a continuing reduction of the pressure in the brake cylinder means, pressure responsive switch means for causing deenergization of the electroresponsive valve means and a consequent increase of pressure in the brake cylinder means upon the reduction of the pressure in the brake cylinder means to below a certain value, means including a second relay having a slow drop-out characteristic effective to maintain said first relay picked-up for a certain length of time following the instant it is first picked-up and effective to cause deenergization of the electroresponsive valve means at the expiration of the drop-out time of said second relay if deenergization of the electroresponsive valve means has not been previously effected by said brake cylinder pressure responsive means.

13. In a vehicle brake control equipment of the type in which the brakes associated with the vehicle wheels are applied and released under the control of the operator, the combination of an electrical relay having two separate windings, means for energizing one of the windings of said relay in a manner to cause pick-up of the relay when a certain wheel unit of the vehicle begins to slip, means for causing energization of the other winding of said relay in a manner to cause pick-up of the relay when a different wheel unit of the vehicle begins to slip, means responsive to the pick-up of said relay for maintaining one of the windings of said relay energized to a sufficient degree to maintain the relay picked-up for a certain length of time at the expiration of which the relay is restored to its dropped-out position, and means controlled by said relay effective upon the pick-up of said relay to initiate a continuing reduction in the degree of application of the brakes associated with said certain and said different wheel units and upon restoration of the relay to its dropped-out position to terminate further reduction in the degree of application of the brakes and initiate an increase in the degree of application of the brakes associated with said wheel units.

14. In a vehicle brake control equipment of the type in which the brakes associated with the vehicle wheels are applied and released under the control of the operator, the combination of an electrical relay having two separate windings, means for energizing one of the windings of said relay by a current substantially proportional to the rate of rotative deceleration of one wheel unit of the vehicle, means for energizing the other winding of said relay by a current substantially proportional to the rate of rotative deceleration of a different wheel unit of the vehicle, said windings cooperating in a manner to cause pick-up of the relay, only when either one or both of the windings is energized by a current exceeding a certain value occurring in response to the rotative deceleration of the corresponding wheel unit at a rate exceeding a certain slipping rate, means for maintaining one of the windings of said relay energized to a sufficient degree to maintain the relay picked-up for a certain length of time following the initial pick-up thereof, and means controlled by said relay effective in response to the pick-up of said relay to initiate a continuing reduction in the degree of application of the brakes associated with said wheel units and operative in response to the drop-out of said relay to terminate further reduction in the degree of application of the brakes and initiate an increase in the degree of application of the brakes associated with said wheel units.

15. In a vehicle brake control equipment of the type in which the brakes associated with the vehicle wheels are applied and released under the control of the operator, the combination of an electrical relay having two separate windings, means for energizing one of said windings of said relay in a manner to cause pick-up of the relay when one wheel unit of the vehicle begins to slip, means for energizing the other winding of said relay in a manner to cause pick-up of said relay when a second wheel unit of the vehicle begins to slip, a normally charged condenser, means responsive to the pick-up of said relay for causing said condenser to discharge through one of the windings of said relay to maintain the relay in its picked-up position for a certain limited length of time following the initial pick-up thereof, and means controlled by said relay effective in response to the pick-up of said relay to initiate a continued reduction in the degree of application of the brakes associated with said wheel units and operative in response to the drop-out of said relay to terminate further reduction in the degree of application of the brakes and initiate an increase in the degree of application of the brakes associated with said wheel units.

16. In a vehicle brake control equipment of the type in which the brakes associated with the vehicle wheels are applied and released under the control of the operator, the combination of an electrical relay having two separate windings, means for causing energization of one of the windings of said relay by a current substantially proportional to the rate of rotative deceleration of one wheel unit of the vehicle, means for causing energization of the other winding of said relay by a current substantially proportional to the rate of rotative deceleration of a second wheel unit of the vehicle, said windings cooperating and being so designed so as to cause pick-up of the relay whenever either one or both are energized by a current corresponding to a certain rate of rotative deceleration of the corresponding wheel unit occurring only when the wheel unit slips, a normally charged electrical condenser, means responsive to the pick-up of said relay for causing said condenser to discharge current through one of the windings of said relay to maintain the relay picked-up for a certain limited length of time corresponding to the time that the current discharged from the condenser exceeds a certain value, and means controlled by said relay effective in response to the pick-up of the relay to initiate a continuing reduction in the degree of application of the brakes associated with said wheel units and operative upon the drop-out of said relay to terminate further reduction in the degree of application of the brakes and initiate an increase in the degree of application of the brakes associated with said wheel units.

17. In a vehicle brake control equipment of the type in which the brakes associated with the vehicle wheels are applied and released under the control of the operator, the combination of an electrical relay having two separate windings, means for supplying a direct-current voltage substantially proportional to the rotational speed of one wheel unit of the vehicle, means for supplying a direct-current voltage substantially proportional to the rotational speed of a second wheel unit of the vehicle, two electrical condensers, one of the windings of said relay and one of said condensers being subject in series relation to the voltage delivered by one of said voltage supply means, the other winding of said relay and the other of said condensers being subject in series relation to the voltage delivered by the other of said voltage supply means, each of said condensers being effective to discharge a current through the corresponding winding of the said relay in response to a reduction of the voltage of the corresponding voltage supply means occurring upon deceleration of the vehicle which current is substantially proportional to the rate of rotative deceleration of the corresponding wheel unit, said windings being so designed and cooperating in such a manner as to cause pick-up of the relay when either or both of the windings is energized by a current discharged from the corresponding condenser exceeding a certain value and corresponding to a rate of rotative deceleration of the corresponding wheel unit occurring only when the wheel unit slips, means operative in response to the pick-up of the relay for disconnecting one of the windings of the relay and the corresponding condenser from the corresponding voltage supply means and connecting said disconnected condenser in shunt relation to said winding to cause said condenser to discharge at least a predetermined current therethrough to maintain the relay picked-up for a certain limited length of time, and means effective in response to the pick-up of said relay for initiating a continuing reduction in the degree of application of the brakes associated with said wheel units and operative in response to the drop-out of said relay for terminating further reduction in the degree of application of the brakes and initiating an increase in the degree of application of the brakes associated with said wheel units.

18. In a vehicle brake control equipment of the type in which the brakes associated with the vehicle wheels are applied and released under the control of the operator, the combination of an electrical relay having two separate windings, means for supplying a direct-current voltage substantially proportional to the rotational speed of one wheel unit of the vehicle, means for supplying a direct-current voltage substantially proportional to the rotational speed of a second wheel unit of the vehicle, two electrical condensers, one of the windings of said relay and one of said condensers being subject in series relation to the voltage delivered by one of said voltage supply means, the other winding of said relay and the other of said condensers being subject in series relation to the voltage delivered by the other of said voltage supply means, each of said condensers being effective to discharge a current through the corresponding winding of the said relay in response to a reduction of the voltage of the corresponding voltage supply means occurring upon deceleration of the vehicle which current is substantially proportional to the rate of rotative deceleration of the corresponding wheel unit, said windings being so designed and cooperating in such a manner as to cause pick-up of the relay when either or both of the windings is energized by a current discharged from the corresponding condenser exceeding a certain value and corresponding to a rate of rotative deceleration of the corresponding wheel unit occurring only when the wheel unit slips, a resistor, means effective in response to the pick-up of said relay for disconnecting one of the windings of said relay and its associated condenser from the corresponding voltage supply means and establishing a discharge circuit for said disconnected condenser including the corresponding winding of the relay and said resistor whereby said condenser discharges at least a predetermined current through the corresponding winding to maintain the relay picked-up for at least a certain limited length of time, and means operative in response to the pick-up of said relay for initiating a continued reduction in the degree of application of the brakes associated with said wheel units and operative in response to the drop-out of said relay to cause termination of further reduction in the degree of application of the brakes and initiation of an increase in the degree of application of the brakes associated with said wheel units.

19. In a vehicle brake control equipment of the type in which the brakes associated with the wheels of the vehicle are applied and released under the control of the operator, the combination of an electrical relay having two separate windings, means for energizing one of said windings of said relay to cause pick-up of the relay when one wheel unit of the vehicle begins to slip, means for energizing the other winding of said relay to cause pick-up of the relay when a second wheel unit of the vehicle begins to slip, a normally charged electrical condenser, a resistor, means operative in response to the pick-up of said relay to establish a discharge circuit for said condenser including one winding of said relay and said resistor whereby to maintain said relay picked-up for a certain limited time corresponding to the length of time the current discharged from the condenser exceeds a certain value, and means operative in response to the pick-up of said relay to initiate a continuing reduction in the degree of application of the brakes associated with said wheel units and operative in response to the drop-out of said relay to terminate further reduction in the degree of application of the brakes and initiate an increase in the degree of application of the brakes associated with said wheel units.

20. In a vehicle brake control equipment of the type in which the brakes associated with the vehicle wheels are applied and released under the control of the operator of the vehicle, the combination of electroresponsive control means operative to effect reduction in the degree of application of the brakes associated with a wheel of the vehicle, means responsive to the slipping of said wheel for causing a continuing operation of said electroresponsive control means, means controlled according to the degree of application of the brakes associated with said wheel and effective in its normal manner of operation to cause said electroresponsive control means to terminate further reduction in the degree of application of the brakes when the degree of application of the brakes reduces below a certain value, and timing means set in operation in response to the slipping of said wheel for causing said electroresponsive control means to terminate the reduction in the degree of application of the brakes upon the expiration of a certain length of time following the instant the wheel begins to slip if such reduction is not sooner terminated by the last said means within such time.

21. In a vehicle brake control equipment of the type having a brake cylinder to which fluid under pressure is supplied and from which fluid under pressure is released under the control of the operator of the vehicle for controlling the application and release of the brakes associated with a wheel of the vehicle, the combination of valve means normally in a position to permit the supply of fluid under pressure to said brake cylinder and operative to a different position to effect interruption of the supply of fluid under pressure to the brake cylinder and the rapid exhaust of fluid under pressure therefrom, means responsive to the slipping of said wheel for effecting operation of said valve means to its said different position, means responsive to the reduction of the pressure in the said brake cylinder below a certain value for causing restoration of said valve means from its said different to its said normal position, and timing means set in operation in response to the initiation of slipping of said wheel for causing restoration of said valve means from its said different to its said normal position at the expiration of a certain length of time after it is first operated to its said different position unless said brake cylinder pressure responsive means operates to do so within such time.

22. In a vehicle brake control equipment having an electroresponsive control device effective while in its operated condition to cause reduction in the degree of application of the brakes associated with a wheel of the vehicle, the combination of means effective when said wheel slips for causing said electroresponsive control device to be operated to its operated condition and maintained therein, means responsive to the degree of application of the brakes associated with said wheel and effective in its normal manner of operation in response to the reduction in the degree of application of the brakes to below a certain degree for causing said electroresponsive control device to terminate further reduction in the degree of application of the brakes, and timing means set in operation when said wheel begins to slip for causing said electroresponsive control device to terminate the reduction in the degree of application of the brakes upon the expiration of a certain length of time following the instant the wheel begins to slip if such reduction is not sooner terminated by the last said means within such time.

23. In a vehicle brake control equipment having a control device effective while in an operated condition to cause a continuing reduction in the degree of application of the brakes associated with a wheel of the vehicle, the combination of a relay having two separate windings, one of which windings is effective when energized by a current exceeding a certain value and in one certain direction for causing said relay to be picked-up, means effective to cause said one winding to be energizd by a current in excess of said certain value and in said one certain direction only while said vehicle wheel rotatively decelerates at a slipping rate, said other winding of said relay being effective when energized by a current exceeding a second certain value and in one certain direction for causing said relay to remain picked-up, means effective in response to the pick-up of said relay for causing energization of said other winding of said relay by a current exceeding said second certain value and in said one certain direction for a certain limited time longer than the time that the said one winding remains energized, said relay being effective when picked-up to cause operation of said control device to its operated position and effective when dropped-out to cause said control device to be restored to its normal position terminating the reduction in the degree of application of the brakes.

24. In a vehicle brake control equipment of the type having a brake cylinder to which fluid under pressure is supplied and from which fluid under pressure is released under the control of the operator for effecting application and release of the brakes associated with a wheel of the vehicle, the combination of valve means normally in a position to permit the supply of fluid under pressure to the brake cylinder and operative to a different position to cause a rapid reduction of the pressure in the brake cylinder, a relay effective when operated to its picked-up position to cause operation of said valve means to its said different position, said relay having two separate windings, a first circuit including one of said windings, means for causing a current to flow in said first circuit substantially proportional to the rate of rotative deceleration of said wheel, said one winding of said relay being effective when energized by a current exceeding a certain value for causing pick-up of said relay, a second circuit including the other winding of said relay, means responsive to the pick-up of said relay for establishing said second circuit, and means for causing a current exceeding a certain value to flow in said second circuit for only a certain limited time whereby to cause said other winding of said relay to maintain said relay picked-up for only a certain length of time.

25. In a vehicle brake control equipment of the type in which the brakes associated with a wheel of the vehicle are applied and released under the control of the operator of the vehicle, the combination of a relay having two separate windings, one of which windings is effective when energized by a current in one certain direction and exceeding a certain value for causing said relay to be picked-up, means effective to cause said one winding to be energized by a current in said one certain direction and exceeding said certain value only while the said vehicle wheel rotatively decelerates at a rate exceeding a certain rate, said other winding of said relay being effective when energized by a current exceeding a second certain value and in one certain direction for causing said relay to remain picked-up, means effective in response to the pick-up of said relay for causing a current exceeding said second certain value to flow in said one certain direction through said second winding of said relay for a certain limited time whereby to maintain said relay picked-up for a certain length of time once it is picked-up, and electroresponsive means controlled by said relay and effective only so long as said relay is picked-up for causing reduction in the degree of application of the brakes associated with said wheel.

26. In a brake control equipment for a vehicle having two separately rotatable wheels and pressure responsive means to which fluid under pressure is supplied and from which fluid under pressure is released for effecting application and release of the brakes associated with said wheels, the combination of valve means normally in a position to permit the supply of fluid under pressure to said pressure responsive means and operative to a different position to cause a rapid reduction of the pressure acting on said pressure responsive means, two relays one of which is associated with one of said wheels and the other of which is associated with the other of said wheels, said one relay having a winding effective when energized by a current exceeding one certain value and flowing in one certain direction therethrough for causing pick-up of the relay, said other relay having two separate windings one of which is effective when energized by a current exceeding one certain value and flowing in one certain direction therethrough for causing said other relay to be picked-up and the other of which is effective when energized by a current exceeding a second certain value and flowing in one certain direction therethrough for causing said other relay to be picked-up or maintained picked-up if it is already picked-up so long as such current endures, means for causing the winding of said one relay to be energized by a current exceeding said one certain value and flowing in said one certain direction therethrough only so long as said one wheel rotatively decelerates at a rate exceeding a certain rate, means for causing the said one winding of said other relay to be energized by a current exceeding said one certain value and flowing in said one certain direction only so long as the other of said wheels rotatively decelerates at a rate exceeding a certain rate, means effective upon the pick-up of either of said relays for causing the other winding of said other relay to be energized by a current exceeding said second certain value and flowing in said one certain direction therethrough for a certain limited time only, said other relay being effective when picked-up for causing operation of said valve means to its different position and effective to cause restoration of said valve means to its normal position whenever said relay drops out.

CLAUDE M. HINES.